US009692687B2

(12) United States Patent
Kompella et al.

(10) Patent No.: US 9,692,687 B2
(45) Date of Patent: Jun. 27, 2017

(54) METHOD AND APPARATUS FOR RAPID REROUTING OF LDP PACKETS

(75) Inventors: Vach P. Kompella, Cupertino, CA (US); Pranjal K. Dutta, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 277 days.

(21) Appl. No.: 13/050,989

(22) Filed: Mar. 18, 2011

(65) Prior Publication Data

US 2012/0236860 A1   Sep. 20, 2012

(51) Int. Cl.
| | |
|---|---|
| H04L 12/28 | (2006.01) |
| H04L 12/703 | (2013.01) |
| H04L 12/705 | (2013.01) |
| H04L 12/723 | (2013.01) |

(52) U.S. Cl.
CPC .............. *H04L 45/28* (2013.01); *H04L 45/18* (2013.01); *H04L 45/507* (2013.01)

(58) Field of Classification Search
CPC ....... H04L 45/18; H04L 45/28; H04L 45/507; H04L 45/22; H04L 45/50; H04L 45/00; H04L 45/02; H04Q 2213/13145; H04Q 2213/13166
USPC .......................... 370/392, 216, 225; 709/238
IPC ............................... H04L 45/28, 45/18, 45/507
See application file for complete search history.

(56) References Cited

U.S. PATENT DOCUMENTS

| | | | |
|---|---|---|---|
| 6,055,561 A | 4/2000 | Feldman et al. | |
| 2005/0088965 A1* | 4/2005 | Atlas et al. | 370/216 |
| 2006/0013127 A1* | 1/2006 | Izaiku | H04L 45/02 370/225 |

(Continued)

FOREIGN PATENT DOCUMENTS

| | | |
|---|---|---|
| CN | 101529869 A | 9/2009 |
| EP | 1 318 648 A2 | 6/2003 |

(Continued)

OTHER PUBLICATIONS

The International Search Report and the Written Opinion of the International Searching Authority, or the Declaration, mailed May 16, 2012, in PCT/US2012/029027, Alcatel-Lucent USA Inc., Applicant, 12 pages.

(Continued)

*Primary Examiner* — Shaq Taha
*Assistant Examiner* — Lionel Preval
(74) *Attorney, Agent, or Firm* — Tong, Rea, Bentley & Kim, LLC

(57) ABSTRACT

A u-turn fast rerouting capability is provided. A first node propagates a packet toward a second node based on selection of a first routing path for routing the packet from the first node toward an intended destination node. The second node received the packet, determines that the packet cannot be delivered to the destination node via the first routing path, inserts a u-turn label into the packet, and returns the packet to the first node. The u-turn label indicates that the packet is being returned to the first node by the second node due to a condition preventing propagation of the packet toward the destination node using the first routing path. The first node receives the packet including the u-turn label, selects a second routing path for routing the packet toward the (Continued)

destination node, and propagates the packet toward the destination node based on the second routing path.

14 Claims, 8 Drawing Sheets

(56) References Cited

U.S. PATENT DOCUMENTS

| | | | |
|---|---|---|---|
| 2006/0087965 A1* | 4/2006 | Shand | H04L 41/0663 370/218 |
| 2007/0036072 A1* | 2/2007 | Raj et al. | 370/225 |
| 2007/0174483 A1* | 7/2007 | Raj et al. | 709/238 |
| 2011/0007629 A1* | 1/2011 | Atlas | H04L 45/00 370/225 |

FOREIGN PATENT DOCUMENTS

| | | |
|---|---|---|
| JP | 2006033307 A | 2/2006 |
| JP | 2008219083 A | 9/2008 |
| WO | WO 2008/052339 A1 | 5/2008 |

OTHER PUBLICATIONS

Atlas A et al: "U-turn Alternates for IP/LDP Fast-Reroute; draft-atlas-ip-local-prote ct-uturn-03.txt," Feb. 1, 2006, No. 3, Feb. 1, 2006 (Feb. 1, 2006),XP015043276, issn: 0000-0004, figure 1, p. 3, line 14-p. 4, line 2,paragraph [02.3].

A.Atlas, A. Zinin, "Basic Specification for IP Fast Reroute: Loop-Free Alternates," Network Working Group, RFC 5286, Sep. 2008, http://tools.ietf.org/html/rfc5286.

Chinese Office Action from corresponding application 2012800141189, dated Apr. 20, 2014, 14 pages.

Korean Office Action from corresponding application 2013-7024553 dated Aug. 20, 2014, 6 pages.

Korean Office Action from corresponding application 2013-7024553 dated Feb. 16, 2015, 4 pages.

* cited by examiner

METHOD AND APPARATUS FOR RAPID REROUTING OF LDP PACKETS

TECHNICAL FIELD

The invention relates generally to communication networks and, more specifically but not exclusively, to rerouting of packets in communication networks.

BACKGROUND

Internet Protocol (IP) Fast Reroute, as described in Request for Comment (RFC) 5286, is a technique for forwarding traffic within a network, without incurring loss during an outage, when there is sufficient redundancy in the network to support alternative paths. More specifically, RFC 5286 describes a technique for using loop-free alternates to provide local protection for traffic, in pure IP networks and in Multiprotocol Label Switching (MPLS) networks using the Label Distribution Protocol (LDP), in the event of a failure condition (e.g., failure of a link, node, or shared risk link group (SRLG).

In many IP networks employing IP Fast Reroute, for example, the IP networks may recover from failures by rerunning a shortest path algorithm while assuming that the failed component does not exist in the IP network, which generally leads to an alternative route via which the IP networks may resume forwarding of the traffic. Disadvantageously, however, rerouting packets via alternate routes within the context of LDP is generally too slow to satisfy customer Quality-of-Service (QoS) expectations for voice and other applications (e.g., the associated recovery/reroute time may exceed several seconds) and, further, packets forwarded to a node associated with a dropped link may be routed in a manner that creates a loop condition that may render a portion of the network unusable.

SUMMARY

Various deficiencies in the prior art are addressed by embodiments of a u-turn fast rerouting capability.

In one embodiment, a method includes receiving a packet at a first node, where the packet is received from a second node and is intended for a destination node and where the packet includes a u-turn label adapted for indicating to the first node that the packet is being returned to the first node by the second node due to a condition preventing propagation of the packet toward the destination node using a first routing path selected by the first node for routing the packet toward the destination node, and selecting, at the first node based on inclusion of the u-turn label within the packet, a second routing path for routing the packet toward the destination node.

In one embodiment, an apparatus includes a processor configured to receive a packet at a first node, where the packet is received from a second node and is intended for a destination node and where the packet includes a u-turn label adapted for indicating to the first node that the packet is being returned to the first node by the second node due to a condition preventing propagation of the packet toward the destination node using a first routing path selected by the first node for routing the packet toward the destination node, and select, at the first node based on inclusion of the u-turn label within the packet, a second routing path for routing the packet toward the destination node.

In one embodiment, a method includes receiving a packet at a first where the packet is intended for a destination node and where the packet is received from a second node based on selection of a first routing path for the packet by the second node, inserting a u-turn label into the packet at the first node to form thereby a modified packet where the u-turn label is adapted for informing the second node that the packet is being returned to the second node by the first node due to a condition preventing propagation of the packet toward the destination node using a first routing path selected by the second node, and transmitting the modified packet from the first node toward the second node for indicating to the second node that a second routing path is to be selected by the second node for routing the packet toward the destination node.

In one embodiment, an apparatus includes a processor configured to receive a packet at a first where the packet is intended for a destination node and where the packet is received from a second node based on selection of a first routing path for the packet by the second node, insert a u-turn label into the packet at the first node to form thereby a modified packet where the u-turn label is adapted for informing the second node that the packet is being returned to the second node by the first node due to a condition preventing propagation of the packet toward the destination node using a first routing path selected by the second node, and transmit the modified packet from the first node toward the second node for indicating to the second node that a second routing path is to be selected by the second node for routing the packet toward the destination node.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Figure 1:
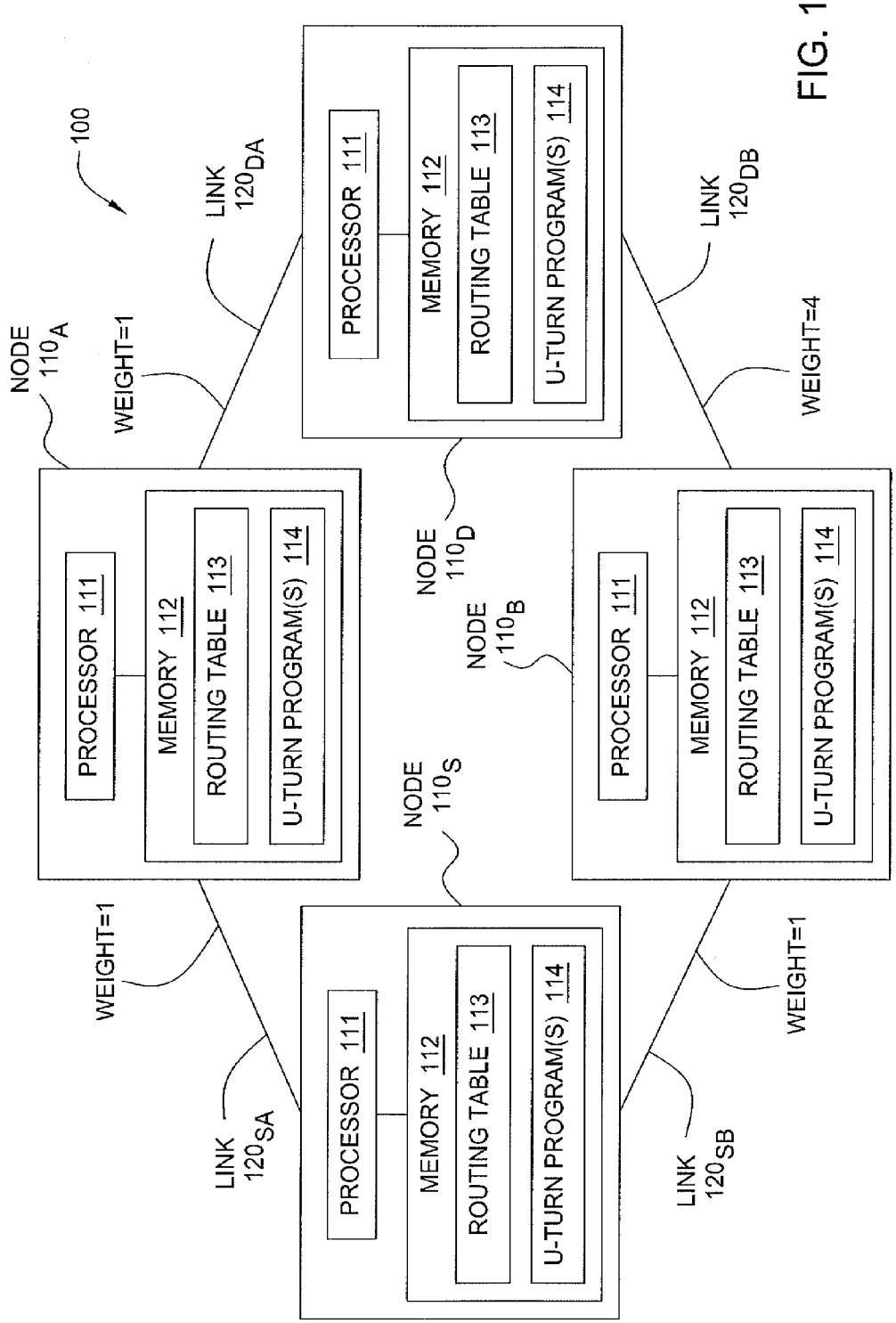
FIG. 1 depicts an exemplary communication network illustrating use of u-turn labels to facilitate rapid rerouting of LDP packets.

A u-turn fast rerouting capability is depicted and described herein. The u-turn fast rerouting capability enables fast rerouting of packets in a manner preventing dropping of packets and preventing formation of forwarding loops.

Although the u-turn fast rerouting capability is primarily depicted and described herein within the context of an Internet Protocol (IP)/Multiprotocol Label Switching (MPLS) network running the Label Distribution Protocol (LDP), it will be appreciated that the u-turn fast rerouting capability may be utilized in other suitable types of communication networks using other suitable protocols.

Various embodiments of the u-turn fast rerouting capability may be better understood by first considering an example of a network in which a source node (S) is transmitting traffic to a destination node (D) where the network includes two different paths from S to D. In this example, assume that a first of the two paths traverses a first intermediate node (A) to form a path S-A-D and that a second of the two paths traverses a second intermediate node (B) to form a path S-B-D. In this example, further assume that the link weights of all of the links between the nodes are the same.

In this example, assume that traffic is flowing on the first (normal) path S-A-D until the S-A link fails, at which point the routing protocol of the network runs a shortest path algorithm while ignoring the S-A link and, thus, identifies the second (alternate) path S-B-D. This recovery time is typically on the order of a few seconds, during which time the packets destined for D are dropped at S due to lack of an alternate path to D. If the application at D, for which the traffic is intended, can recover from loss, the application can continue with, most likely, only a minor glitch during the recovery period. This could mean that the application at D can ignore the lost packets (e.g., as a voice or video application may do) or the application at S can retransmit the lost packets to D (e.g., as an FTP transfer may do). In this approach, however, the recovery time can be significant for many applications (e.g., voice applications typically expect round-trip response times of less than 250 milliseconds for reasonable interactivity, such that it is unacceptable to have 3 to 5 seconds of missing voice packets during an outage recovery scenario such as the one in the example described above).

A solution to the problem of the example described above is for S to send the packets to B, with an expectation that B would forward the packets to D such that the packets are not lost. For example, if S computed the path from B to D, and determined that it was a safe path for purposes of forwarding packets to D, then S could send the packets to B with an expectation that B would forward the packets to D by identifying the path B-D as the best path along which to forward the packets received from S. In the example above, given that the link weights of all of the links between the nodes are the same, B would identify the path B-D as the best path along which to forward the packets received from S and, thus, would forward the packets to D. However, certain situations may arise in which B would not identify the path B-D as the best path along which to forward packets received from S and, thus, rather than forwarding the packets toward D along the path B-D, would instead forward the packets to S along the path B-S-A-D. These situations may be better understood by considering two modifications to the example described above.

In the original example above, there is a link between nodes B and D. Now consider a modified version of the above example in which there is no link between nodes B and D. In this case, the best (and only) path from B to D is via the path B-S-A-D. As a result, in this modified example, until B learns that link S-A has failed, B will continue to forward the packets received from S back to S. The result, however, is a tight forwarding loop between S and B, which will render that portion of the network unusable (e.g., until a time-to-live (TTL) field of the packet reaches zero and the packet is dropped). Thus, S should forward packets to B only if the path is safe, i.e., the path from B to D does not return to S. In this example, since there is no path from B to D, the best thing for S to do is to drop the packets intended for D (which will occur after the failure is detected and the shortest path algorithm is run).

In the original example above, the weights of all of the links between the nodes are the same. Now consider a modified version of the above example in which the weight of the link B-D is greater than the combined weight of links B-S, S-A, and A-D. In this case, although there are two paths from B to D, B will consider the path B-S-A-D to be a better path than path B-D, due to the difference in weights. As a result, in this modified example, until B learns that link S-A has failed and the routing protocol converges, B will continue to identify the path B-S-A-D as the best path and, thus, will continue to forward the packets in a manner that results in creation of a loop condition, which, again, will render that portion of the network unusable.

Various embodiments of the u-turn fast rerouting capability which may prevent formation of such loops may be better understood by first considering FIG. 1.

FIG. 1 depicts an exemplary communication network illustrating use of u-turn labels to facilitate rapid rerouting of LDP packets.

In general, communication network 100 may be implemented as any suitable network and, thus, may include any suitable type(s) of nodes running any suitable protocols. In one embodiment, for example, communication network 100 is implemented as IP/MPLS network including Label Switching Routers (LSRs) running LDP. It will be appreciated that communication network 100 may be implemented in any other suitable manner.

As depicted in FIG. 1, communication network 100 includes a source node $110_S$ (also referred to herein as node S) and a destination node $110_D$ (also referred to herein as node D), each of which is connected to two intermediate nodes $110_A$ and $110_B$ (also referred to herein as nodes A and B, respectively). The node S is connected to nodes A and B via a pair of links $120_{SA}$ and $120_{SB}$ (also referred to herein as links S-A and S-B, respectively). The node D is connected to nodes A and B via a pair of links $120_{DA}$ and $120_{DB}$ (also referred to herein as links D-A and D-B, respectively). The link weights of the links $120_{SA}$, $120_{SB}$, $120_{DA}$, and $120_{DB}$ are one, one, one, and four, respectively.

As further depicted in FIG. 1, each of the nodes 110 is configured to support various functions of the u-turn fast rerouting capability depicted and described herein. For example, each of the nodes 110 includes a processor 111 and a memory 112, where the memory 112 includes a routing table 113 and u-turn programs 114.

The routing table 113 of a node 110 is configured to support routing of different types of packets using different types of rules, such as routing IP packets using a first rule (which is associated with a normal routing path), routing LDP packets without u-turn labels using a second rule (which is associated with a normal routing path), routing LDP packets with u-turn labels using a third rule (which is associated with an alternate routing path), and the like.

In one embodiment, for example, for a given destination node, the routing table 113 includes three rules as follows:

(1) when an IP packet is received: use the Forwarding Equivalence Class (FEC) to find a next-hop label for the packet, insert the next-hop label, and forward the packet from the node 110 along a normal routing path toward the destination node;

(2) when an LDP-label packet having a current next-hop LDP label (i.e., a normally-labeled LDP packet that does not have a u-turn label associated therewith) is received: find a next-hop LDP label for the LDP-labeled packet, replace the current next-hop LDP label with the determined next-hop LDP label, and forward the packet from the node 110 along a normal routing path toward the destination node; and (3) when an LDP-label packet having a current next-hop LDP label and a u-turn label is received: find a next-hop LDP label for the LDP-labeled packet, replace the current next-hop LDP label with the determined next-hop LDP label, and forward the packet from the node 110 along an alternate routing path toward the destination node (optionally, this also may include determining a local u-turn label of the node 110 and replacing the u-turn label with the local u-turn label of the node 110).

The u-turn programs 114 are configured to support various functions of the u-turn fast rerouting capability. For example, the u-turn programs 114 of a node 110 may be configured for enabling the node 110 to exchange u-turn labels with peer nodes 110 for use in configuring itself to support use of u-turn labels for facilitating rapid rerouting of LDP packets, for configuring the routing table 113 of the node 110 to include alternate routing paths for use by node 110 when packets including u-turn labels are received, for inserting u-turn labels into packets for informing peer nodes 110 to use alternate routing paths under certain conditions, and the like, as well as various combinations thereof.

As described herein, packet routing loop conditions may be avoided through use of a specific label which is denoted herein as a u-turn label. The use of a u-turn label to avoid a packet routing loop condition may be better understood by considering an exemplary use of a u-turn label within the communication network 100 of FIG. 1. In this example, assume that the node S is transmitting packets to node D via node A until link S-A fails, at which time node S begins trying to transmit packets to node D via node B. When node B receives a packet from node S that is intended for node D, node B uses its routing table to determine a best path to node D and forwards the packet according to the determined path. In this example, since node B is not aware of the unavailability of the link S-A and given the link weights of the links 120, the routing table of node B is configured such that the path B-S-A-D is the normal routing path to node D and the path B-D is the alternate routing path to node D. As a result, since the packet does not include a u-turn label, node B forwards the packet received from node S back toward node S. When node S receives the packet from node B, node S is aware that the packet cannot be forwarded to node D via node A and, therefore, transmits the packet back to node B. The node S, however, in order to avoid a packet routing loop between itself and node B, inserts a u-turn label into the packet before transmitting the packet back to node B. The u-turn label is adapted to inform node B that the packet is being returned to node B by node S deliberately (i.e., since the normal routing path selected by node B from its routing table based on normal routing has a condition associated therewith) and that node B is to select an alternate routing path for use in routing the packet to node D. As described above, when node B first received the packet, node B selected the normal routing path B-S-A-D as being the best path to node D (due to absence of a u-turn label in the packet); however, upon receiving the packet including the u-turn label, node B then knows not to select normal routing path B-S-A-D but, rather, to select the alternate routing path B-D (i.e., to forward the packet to node D rather than to node S). In this manner, the u-turn label allows node B to bypass its normal routing when selecting a next hop node for the packet (e.g., node S when normal routing is applied) and, instead, to employ its u-turn mechanism when selecting a next hop node for the packet (e.g., node D when the u-turn mechanism is applied). The node B then forwards the packet to node D rather than to node S, thereby avoiding the packet routing loop that would otherwise occur between nodes B and S in the absence of the u-turn fast rerouting capability). As described herein, node B may select the alternate routing path instead of the normal routing path, upon receiving the packet returned from node S, using its routing table, where its routing table is configured to apply different packet routing rules for forwarding received packets depending on whether or not those received packets include u-turn labels. The node B, when forwarding the packet to node D, may insert its own u-turn label into the packet (while this is not required in this example, it may be used where there are one or more intermediate nodes between node B and node D such that the intermediate node(s) may be informed that the u-turn approach is being applied).

As described with respect to the example above, each of the nodes 110 is configured to insert u-turn labels into packets under certain conditions and to process received packets based on whether or not those received packets include u-turn labels. As such, each of the nodes 110 is configured to support use of u-turn labels, which may include configuration of each of the nodes 110 with its own u-turn label(s), configuration of each of the nodes 110 to have information regarding u-turn label(s) being used by its peer node(s) 110, configuration of the routing tables 113 of each of the nodes 110 in a manner enabling selection of normal routing paths for packets without u-turn labels and selection of alternate routing paths for packets including u-turn labels, and the like, as well as various combinations thereof.

In one embodiment, each node 110 may have one or more u-turn labels assigned thereto. The determination as to whether a node 110 has one or multiple u-turn labels assigned thereto may be based on the structure of the packets being exchanged between the nodes 110 and the handling of Forwarding Equivalence Classes (FECs) within exemplary communication network 100.

In general, a FEC identifies a set of packets for which the forwarding decision is always the same. For example, if a route 10.10.1/24 is advertised by node D, then node B knows that all packets that are destined for that route (i.e., all packets having a destination IP address from 10.10.1.1 through 10.10.1.24) should be sent to node S (assuming that all links of the exemplary communication network 100 are operational).

In LDP, without use of the u-turn fast rerouting capability, an LDP label would be assigned in order to indicate that FEC. For example, prior to exchanging of packets, node S would have sent node B a label for FEC 10.10.1/24 (e.g., label 100 or any other suitable value), that indicates to node B that, if node B has a packet destined to any of the IP addresses in 10.10.1/24, node B should place that LDP label (i.e., 100) on the packet. Similarly, for example, prior to exchanging of packets, node B would have sent node S a label for FEC 10.10.1/24 (e.g., label 200 or any other suitable value), that indicates to node S that, if node S has a packet destined to any of the IP addresses in 10.10.1/24, node S should place that LDP label (i.e., 200) on the packet. This allows nodes S and B to quickly determine how packets are to be forwarded.

In one embodiment, in which packets having u-turn labels include both the original LDP label that is used for identifying the FEC and the u-turn label, presence of the LDP label enables a single u-turn label to be used across all FECs, such that each node 110 only needs to allocate a single u-turn label to exchange with its peer nodes 110. An exemplary packet according to one such embodiment is depicted and described with respect to FIG. 2.

As an example, node B could provide node S with a normal LDP label for the FEC for node D and a u-turn label for use with any FEC to which node B routes packets. In this example, when node A fails, node S will send the packets to node B using a two-label stack including the normal LDP label for the FEC for node D and the u-turn label of node B). As a result, node B would then override normal packet forwarding (because the packet includes the u-turn label of node B in addition to the normal LDP label for the FEC for node D) and, thus, would forward the packet to node D rather than returning the packet to node S. An advantage of this approach is that only a single label u-turn label needs to be used regardless of the number of FECs supported; however, this advantage is at the expense of having to use a two-label stack when routing packets in order to support the u-turn fast rerouting capability.

In one embodiment, in which packets having u-turn labels include only the u-turn label but do not include the original LDP label that is used for identifying the FEC, absence of the LDP label within the packet may require multiple u-turn labels to be used for multiple FECs, such that each node 110 may need to allocate multiple u-turn labels to exchange with its peer nodes 110 (e.g., one for each FEC).

As an example, node B could provide node S with a normal LDP label for the FEC for node D and a u-turn label for the FEC for node D such that, when node A fails, node S could choose to send the packets to node B using a single label (i.e., the u-turn label of the FEC for node D) rather than using two labels (i.e., the normal LDP label for the FEC for node D and the u-turn label for the FEC for node D). As a result, node B would then override normal packet forwarding, because the packet includes the u-turn label of the FEC for node D rather than the normal LDP label for the FEC for node D) and, thus, would forward the packet to node D rather than returning the packet to node S. An advantage of this approach is that only a single label (instead of a stack of two labels) is needed in the packets to distinguish between normal routing and u-turn routing; however, this advantage is at the expense of having to use and manage a larger number of labels than would otherwise be needed in the absence of u-turn fast rerouting capability (e.g., since every FEC needs a normal label and a u-turn label assigned thereto).

As indicated above, each of the nodes 110 exchanges its u-turn label(s) with its peer node(s) 110 for purposes of informing the peer node(s) of the u-turn label(s) that it will use when indicating a u-turn based rerouting of a packet. The nodes 110 may exchange u-turn labels in any suitable manner. In one embodiment, for example, nodes 110 may exchange u-turn labels as part of the LDP session establishment process. For example, when an LDP session is being established between two peer nodes 110, the peer nodes 110 exchange their u-turn labels (e.g., one of the nodes 110 sends its u-turn label(s) to the other of the nodes 110, and vice versa). In one embodiment, for example, nodes 110 may exchange u-turn labels as part of a separate u-turn label exchange process. The nodes 110 may exchange u-turn labels 110 in any other suitable manner.

As described herein, the u-turn labels exchanged by the nodes 110 are used by the nodes 110 later during packet routing, where the nodes 110 are configured to route packets differently based on whether or not the packets include u-turn labels (e.g., using a normal routing path when a packet does not include a u-turn label and using an alternate routing path when a packet does include a u-turn label). Accordingly, in addition to configuring the nodes 110 by associating u-turn labels with the nodes 110 and enabling the nodes 110 to exchange their u-turn labels with their peer nodes 110, the nodes 110 also are configured to support selection of alternate routing paths when packets having u-turn labels are received at the nodes 110.

In one embodiment, in order to enable later use of u-turn labels in this manner, when a target node 110 receives a u-turn label from a peer node 110 during u-turn label exchange, the target node 110 computes one or more alternate routing paths to be used when packets having the u-turn label are received and updates its routing table 113 to include the alternate routing path(s).

The alternate routing path(s) computed by a target node 110 may include any alternate routing path(s) which may be needed by the target node 110 for packets received from the peer node 110 with which the target node 110 has exchanged u-turn labels.

The routing table 113 of the target node may be updated in any suitable manner (e.g., associating multiple rules with a single entry associated with a destination node, providing multiple entries for a destination node where each entry is accessed under different conditions associated with received packets, and the like, as well as various combinations thereof). As routing tables may already include two rules/entries for each destination node, computation of an alternate path to be used for a destination node when a packet intended for the destination node includes a u-turn label results in three rules/entries for each destination node. As described above, the three rules/entries may be defined as follows:

(1) when an IP packet is received: use the FEC to find a next-hop label for the packet, insert the next-hop label, and forward the packet from the node 110 along a normal routing path toward the destination node;

(2) when an LDP-label packet having a current next-hop LDP label (i.e., a normally-labeled LDP packet that does not have a u-turn label associated therewith) is received: find a next-hop LDP label for the LDP-labeled packet, replace the current next-hop LDP label with the determined next-hop LDP label, and forward the packet from the node 110 along a normal routing path toward the destination node; and (3) when an LDP-label packet having a current next-hop LDP label and a u-turn label is received: find a next-hop label for the LDP-labeled packet, replace the current next-hop LDP label with the determined next-hop LDP label, and forward the packet from the node 110 along an alternate routing path toward the destination node (optionally, this also may include determining a local u-turn label of the node 110 and replacing the u-turn label with the local u-turn label of the node 110).

For example, in the example of FIG. 1 described above, when nodes B and S exchanged u-turn labels during establishment of their LDP session, node B computed an alternate routing path to node D for situations in which node B receives packets from node S having the u-turn label of node S. In this example, at node B, the normal routing path for node D is the routing path B-S-A-D, and the alternate routing path computed by node B for the u-turn label received from node S is the routing path B-D. As a result, the routing table of node B for destination node D will include the following three rules/entries:

(1) when an IP packet is received: use the FEC to find a next-hop label for the packet, insert the next-hop label, and forward the packet from node B toward node S;

(2) when an LDP-label packet having a current next-hop LDP label (i.e., a normally-labeled LDP packet that does not have a u-turn label associated therewith) is received: find a next-hop LDP label for the LDP-labeled packet, replace the current next-hop LDP label with the determined next-hop LDP label, and forward the packet from node B toward node S; and (3) when an LDP-label packet having a current next-hop LDP label and a u-turn label is received: find a next-hop LDP label for the LOP-labeled packet, replace the current next-hop LDP label with the determined next-hop LDP label, and forward the packet from node B toward node D.

As described herein, the u-turn label is adapted to enable a first node to inform a second node that a packet being returned to the second node by the first node (where the second node transmitted the packet to the first node using a normal routing path selected at the second node) is being returned to the second node deliberately due to a condition preventing routing of the packet using the normal routing path, thereby instructing the second node to select an alternate routing path for use in routing the packet. Thus, the u-turn labels used by the nodes 110 may be configured in any suitable manner (e.g., using any suitable format, values, and the like). It will be appreciated that the u-turn label enables communication of information which may not be able to be propagated within the IP header of the IP packet (e.g., where there are no bits in the IP header of an IP packet that can be used to communicate the information that is communicated by the u-turn label). In one embodiment, the u-turn label may be implemented as depicted in FIG. 2.

Figure 2:
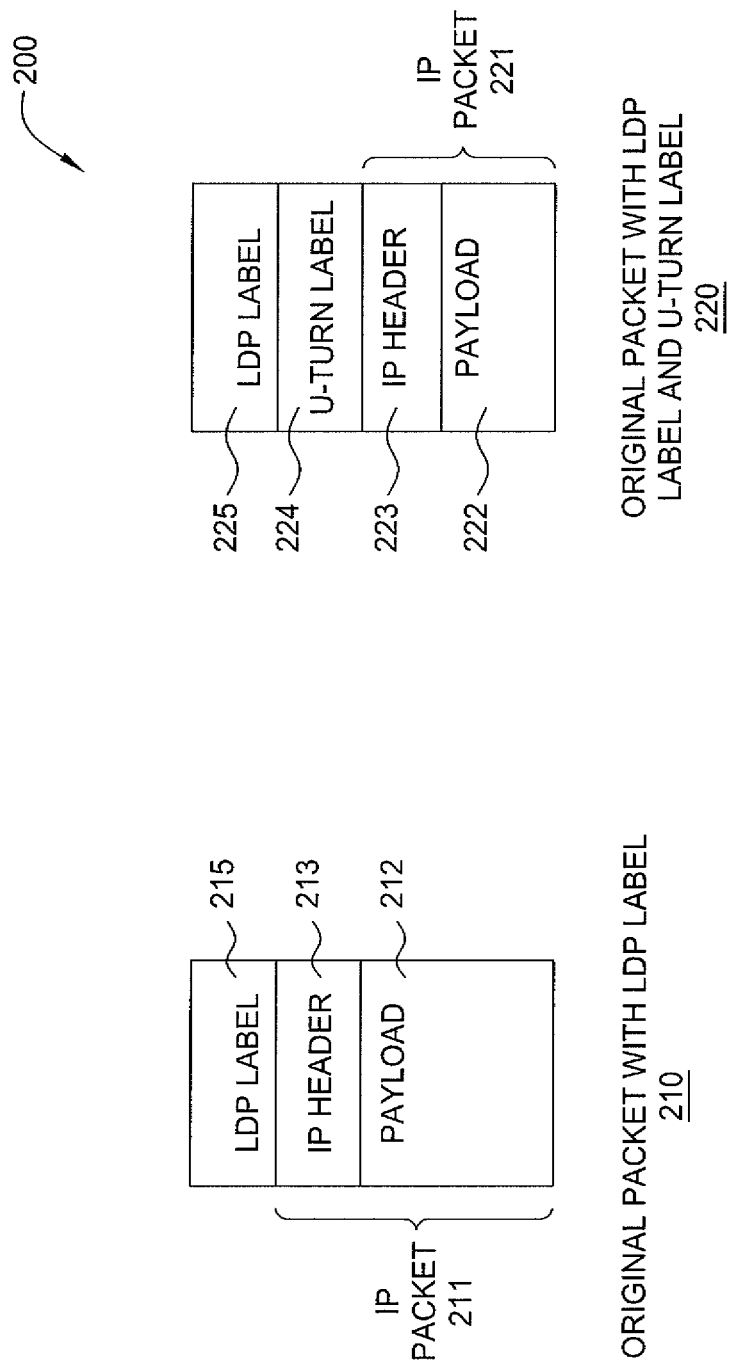
FIG. 2 depicts an embodiment illustrating an original packet having an LDP label and an original packet having an LDP label and a u-turn label.

FIG. 2 depicts an embodiment illustrating an original packet having a LDP label and an original packet having a LOP label and a u-turn label. The original packet having a LOP label 210 includes an IP packet 211 (having a payload 212 and an IP header 213) which has a LDP label 215 prepended thereto. The original packet having a LOP label and a u-turn label 220 includes an IP packet 221 (having a payload 222 and an IP header 223) which has a u-turn label 224 pre-pended thereto which in turn has a LDP label 225 prepended thereto. Although primarily depicted and described herein with respect to a specific arrangement of the u-turn label 224 with respect to the IP packet 221 and LDP label 225, it will be appreciated that any other suitable arrangement(s) of the u-turn label 224 with respect to the IP packet 221 and the LDP label 225 may be used.

Figure 3:
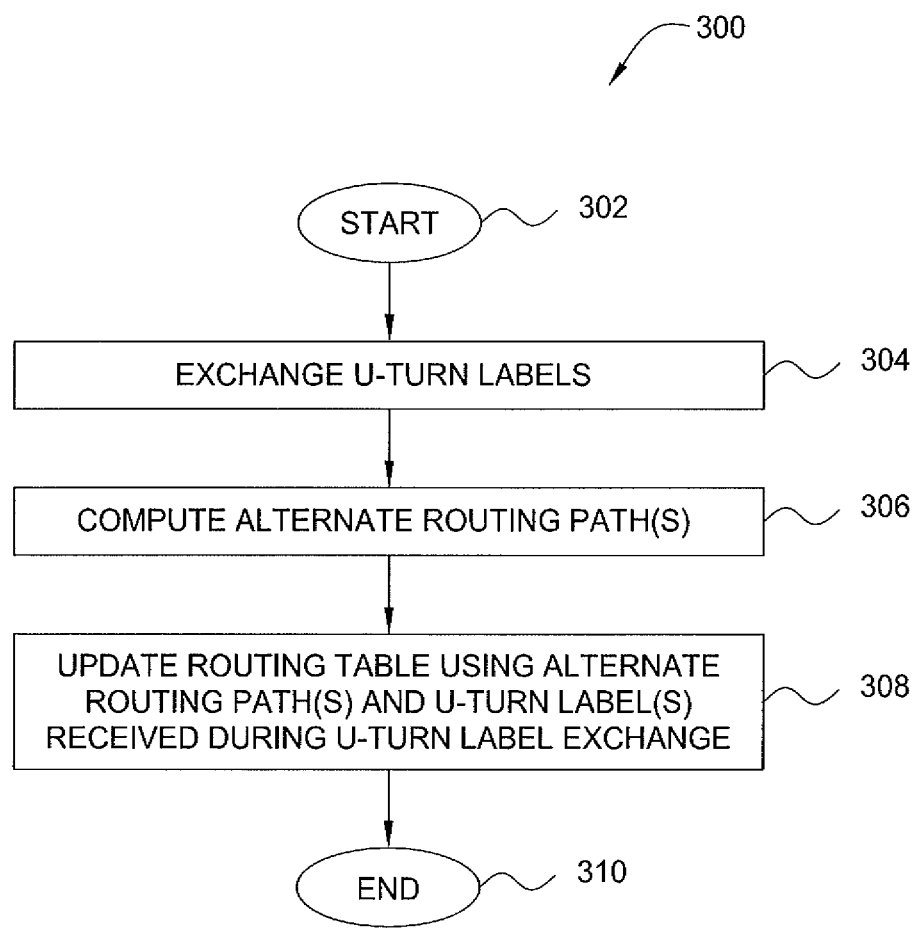
FIG. 3 depicts one embodiment of a method for configuring a node of the exemplary communication system of FIG. 1 to support rapid rerouting of LDP packets using u-turn labels.

FIG. 3 depicts one embodiment of a method for configuring a node of the exemplary communication system of FIG. 1 to support rapid rerouting of LDP packets using u-turn labels. The method 300 is executed by a target node based on interaction by the target node with a peer node.

At step 302, method 300 begins.

At step 304, the target node exchanges u-turn labels with the peer node. The target node sends one or more u-turn labels to the peer node, and receives one or more u-turn labels from the peer node. As described herein, the exchange of u-turn labels may be performed as part of an LDP session establishment process in which the target node and peer node participate.

At step 306, the target node computes one or more alternate routing paths to be used when packets received from the peer node include the u-turn label(s) provided by the peer node during u-turn label exchange.

At step 308, the target node updates its routing table using the alternate routing path(s) and the u-turn label(s) received during u-turn label exchange. The routing table may be updated to reflect an alternate path in any suitable manner (e.g., including a new rule for the alternate path within an existing entry of the routing table, creating a new entry for the alternate path within the routing table, and the like, as well as various combinations thereof).

At step 310, method 300 ends.

Figure 4:
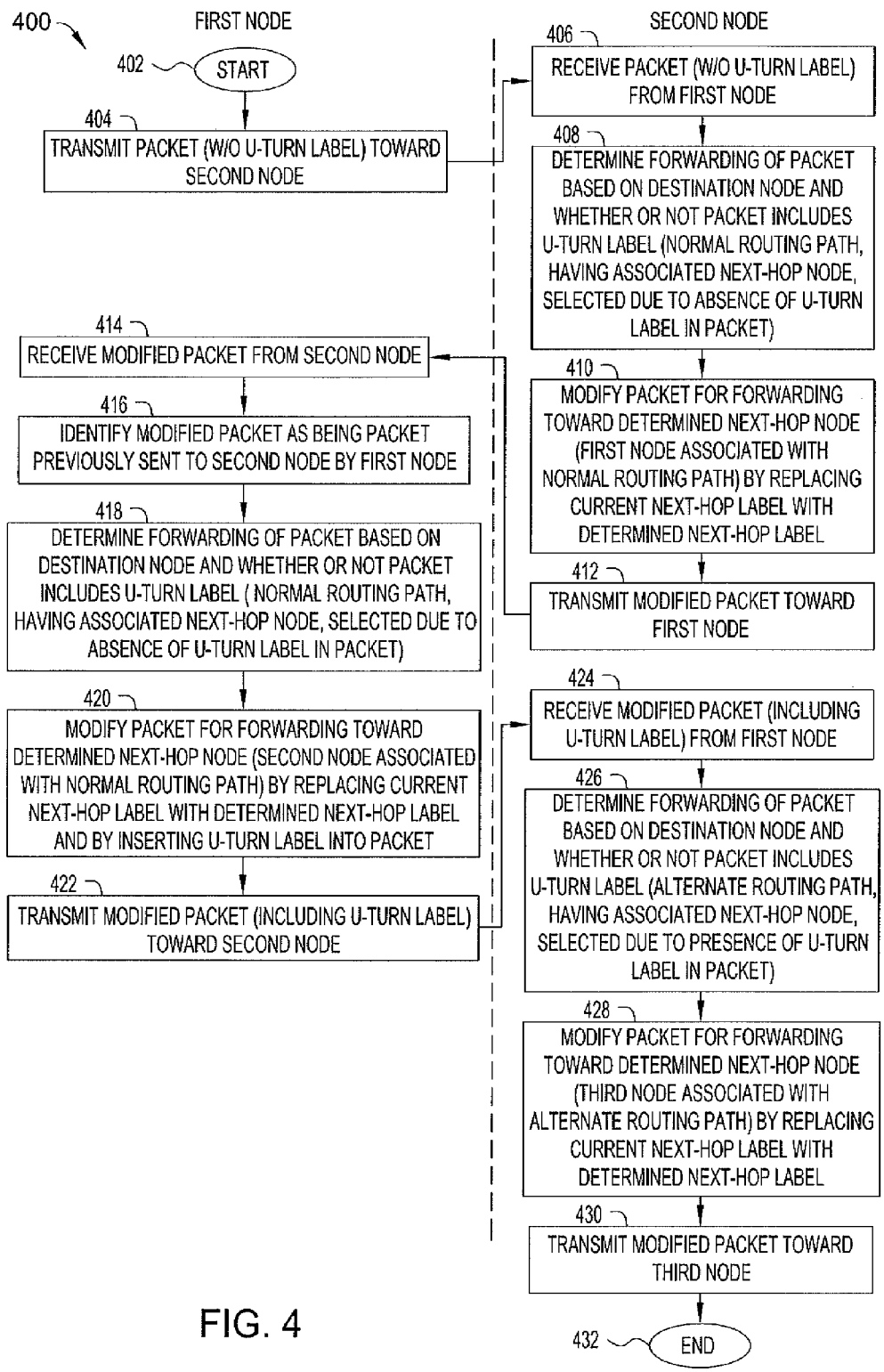
FIG. 4 depicts one embodiment of a method for rapid rerouting of an LDP packet using a u-turn label.

FIG. 4 depicts one embodiment of a method for rapid rerouting of an LDP packet using a u-turn label.

As depicted in FIG. 4, a method 400 includes steps performed by a first node and a second node, where a portion of the steps of method 400 are performed by the first node and a portion of the steps of method 400 are performed by the second node. Thus, it will be appreciated that although depicted as a single method, method 400 may be implemented as one or more processes running on the first node and one or more processes running on the second node and, thus, may be viewed as two or more cooperating processes.

With respect to method 400, the second node is connected to the first node and a third node. The second node has a routing table that includes, for a given destination node, a normal routing path which identifies the first node as the next-hop node toward the destination node and an alternate routing path with identifies the third node as the next-hop node toward the destination node.

With respect to method 400, the first, second, and third nodes associated with method 400 may correspond to any peer nodes 110 of FIG. 1. For example, in the example provided within the context of FIG. 1, node S is the first node, node B is the second node, and node D is the third node.

At step 402, method 400 begins.

At step 404, the first node transmits a packet toward the second node. At step 406, the second node receives the packet from the first node. In one embodiment, the packet is an LDP packet (e.g., an IP packet which has a next-hop LDP label prepended thereto). The packet is intended for the destination node.

At step 408, the second node determines forwarding of the packet. The second node determines a next-hop node to which to forward the packet, based on the destination node and a determination by the second node as to whether or not the packet includes a u-turn label (i.e., a normal routing path to the destination node is selected when the packet does not include a u-turn label and an alternate routing path to the destination node is selected when the packet does include a u-turn label). In this case, since the packet does not include a u-turn label, the second node identifies a normal routing path to be used for routing the packet toward the intended destination node. As described above, the normal routing path identifies the first node as the next-hop node.

At step 410, the second node modifies the packet for forwarding to the determined next-hop node (i.e., the first node). The second node determines a next-hop LDP label for the packet, and replaces the current next-hop LDP label with the determined next-hop LDP label.

At step 412, the second node forwards the modified packet toward the first node. At step 414, the first node receives the packet from the second node. The packet is an LDP packet, which is the same IP packet that was previously sent from the first node to the second node, and which includes the next-hop LDP label prepended to the LDP packet by the second node.

At step 416, the first node identifies the packet as being the packet previously sent to the second node by the first node.

At step 418, the first node determines a next-hop node to which to forward the packet, based on the destination node, using its routing table. In this case, since the packet does not include a u-turn label, the first node identifies a normal routing path to be used for routing the packet toward the intended destination node (which, in this case, again, is the second node). As a result, in order to inform the second node that the first node is deliberately returning the packet to the second node and that the second node should select an alternate routing path for routing the packet (i.e., in order to prevent the formation of a forwarding loop between the first node and the second node), the first node determines that a u-turn label should be inserted into the packet that is returned to the second node.

At step 420, the first node modifies the packet for forwarding to the determined next-hop node (i.e., back to the second node). The first node determines a next-hop LDP label for the packet, and replaces the current next-hop LDP label with the determined next-hop LDP label. The first node also determines a u-turn label (e.g., a u-turn label provided from the second node to the first node during exchange of u-turn labels) and inserts the u-turn label into the packet.

At step 422, the first node forwards the modified packet toward the second node. At step 424, the second node receives the packet from the first node. The packet is an LDP packet, which is the same IP packet that was previously sent from the first node to the second node and from the second node back to the first node, and which includes the next-hop LDP label prepended to the LDP packet by the first node and the u-turn label prepended to the LDP packet by the first node.

At step 426, the second node determines forwarding of the packet. The second node determines a next-hop node to which to forward the packet, based on the destination node and a determination by the second node as to whether or not the packet includes a u-turn label (i.e., a normal routing path to the destination node is selected when the packet does not include a u-turn label and an alternate routing path to the destination node is selected when the packet does include a u-turn label). In this case, since the packet does include a u-turn label, the second node identifies an alternate routing path to be used for routing the packet toward the intended destination node. As described above, the alternate routing path identifies the third node as the next-hop node.

At step 428, the second node modifies the packet for forwarding to the determined next-hop node (i.e., the third node). The second node determines a next-hop LDP label for the packet, and replaces the current next-hop LDP label with the determined next-hop LDP label. The second node also may replace the current u-turn label with its own u-turn label.

At step 430, the second node forwards the modified packet toward the third node.

At step 432, method 400 ends.

As noted above, method 400 may be implemented as one or more processes running on the first node and one or more processes running on the second node and, thus, may be viewed as two or more cooperating processes. Exemplary embodiments of processes which may be performed by nodes 110 (e.g., portions of method 400) are depicted and described with respect to FIGS. 5-7.

Figure 5:
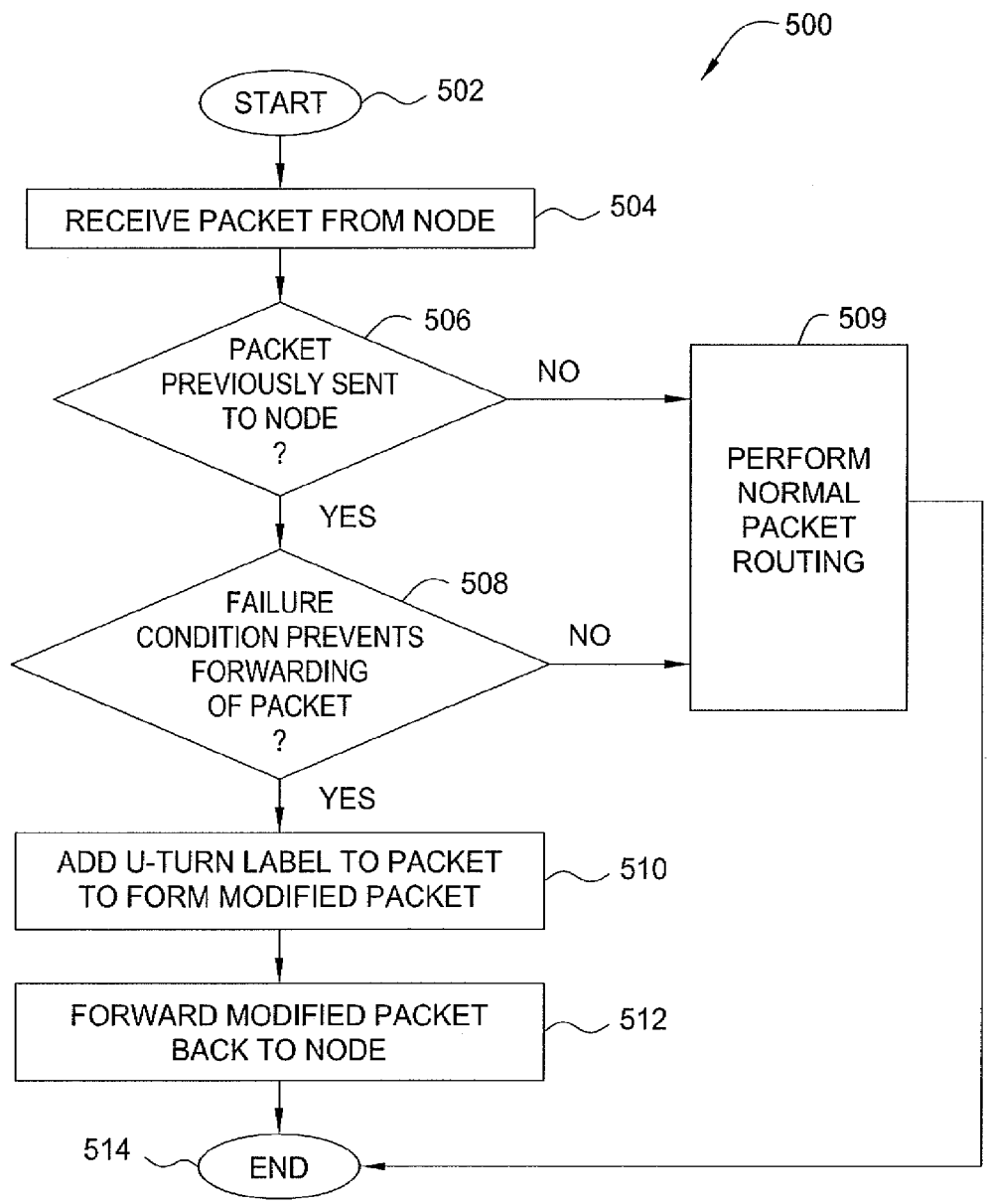
FIG. 5 depicts one embodiment of a method for enabling a target node to add a u-turn label to a packet for informing a node from which the packet was received that the packet is being returned to the node deliberately.

FIG. 5 depicts one embodiment of a method for enabling a target node to add a u-turn label to a packet for informing a node from which the packet was received that the packet is being returned to the node deliberately.

At step 502, method 500 begins.

At step 504, a packet is received from the node.

At step 506, a determination is made as to whether the received packet was previously sent to the node from which the packet was received. If the received packet was not previously sent to the node from which the packet was received, method 500 proceeds to step 509, at which point the target node performs standard packet forwarding for forwarding the packet toward its intended destination (rather than performing a u-turn routing of the packet back to the node from which it was received). If the received packet was previously sent to the node from which the packet was received, method 500 proceeds to step 508.

At step 508, a determination is made as to whether a failure condition prevents forwarding of the received packet by the target node. If a failure condition does not prevent forwarding of the received packet by the target node, method 500 proceeds to step 509, at which point the target node performs standard packet forwarding for forwarding the packet toward its intended destination (again, rather than performing a u-turn routing of the packet back to the node from which it was received). If a failure condition prevents forwarding of the received packet by the target node, method 500 proceeds to step 510.

At step 510, a u-turn label is added to the packet to form a modified packet. As described herein, the u-turn label is configured for indicating to the node that the target node is deliberate returning the packet such that it may be forwarded using an alternate routing path.

At step 512, the modified packet is transmitted from the target node back to the node from which the packet was received.

At step 514, method 500 ends.

It will be appreciated that within the context of the example of FIG. 1, method 500 may be performed by node S which inserts the u-turn label into the packet before returning it to node B. It will be further appreciated that method 500 of FIG. 5 may be performed by any node 110 of FIG. 1.

Figure 6:
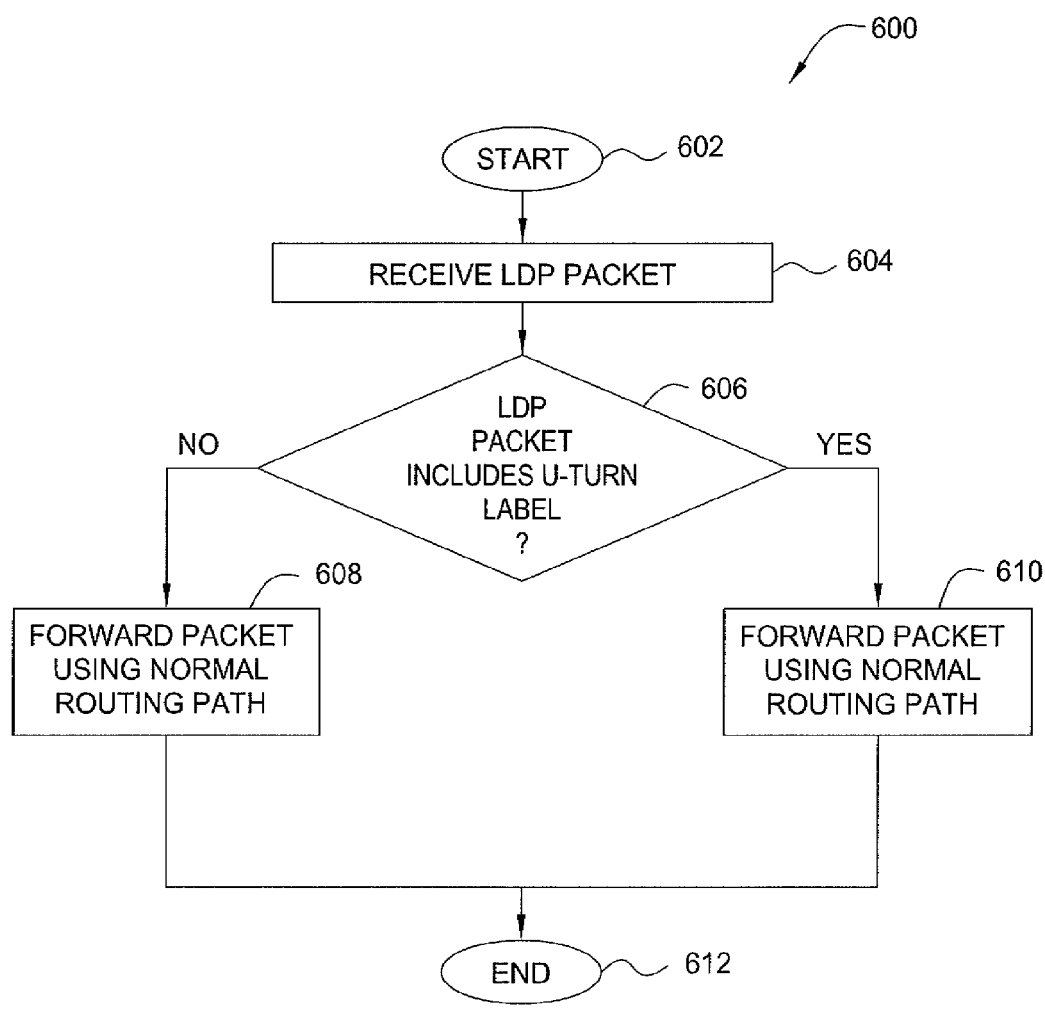
FIG. 6 depicts one embodiment of a method for processing a packet received at a node.

FIG. 6 depicts one embodiment of a method for processing a packet received at a node.

At step 602, method 600 begins.

At step 604, an LDP packet is received at the node.

At step 606, a determination is made as to whether the received LDP packet includes a u-turn label.

If the received LDP packet does not include a u-turn label, method 600 proceeds to step 608, at which point the LDP packet is forwarded using a normal routing path determined by the node for packets intended for the destination node of the received LDP packet. From step 608, method 600 proceeds to step 612.

If the received LDP packet does include a u-turn label, method 600 proceeds to step 610, at which point the LDP packet is forwarded using an alternate routing path determined by the node for packets intended for the destination node of the received LDP packet. From step 610, method 600 proceeds to step 612.

At step 612, method 600 ends.

It will be appreciated that, within the context of the example of FIG. 1, method 600 may be performed at least by nodes S and B. It will be further appreciated that method 600 of FIG. 6 may be performed by any node 110 of FIG. 1.

Figure 7:
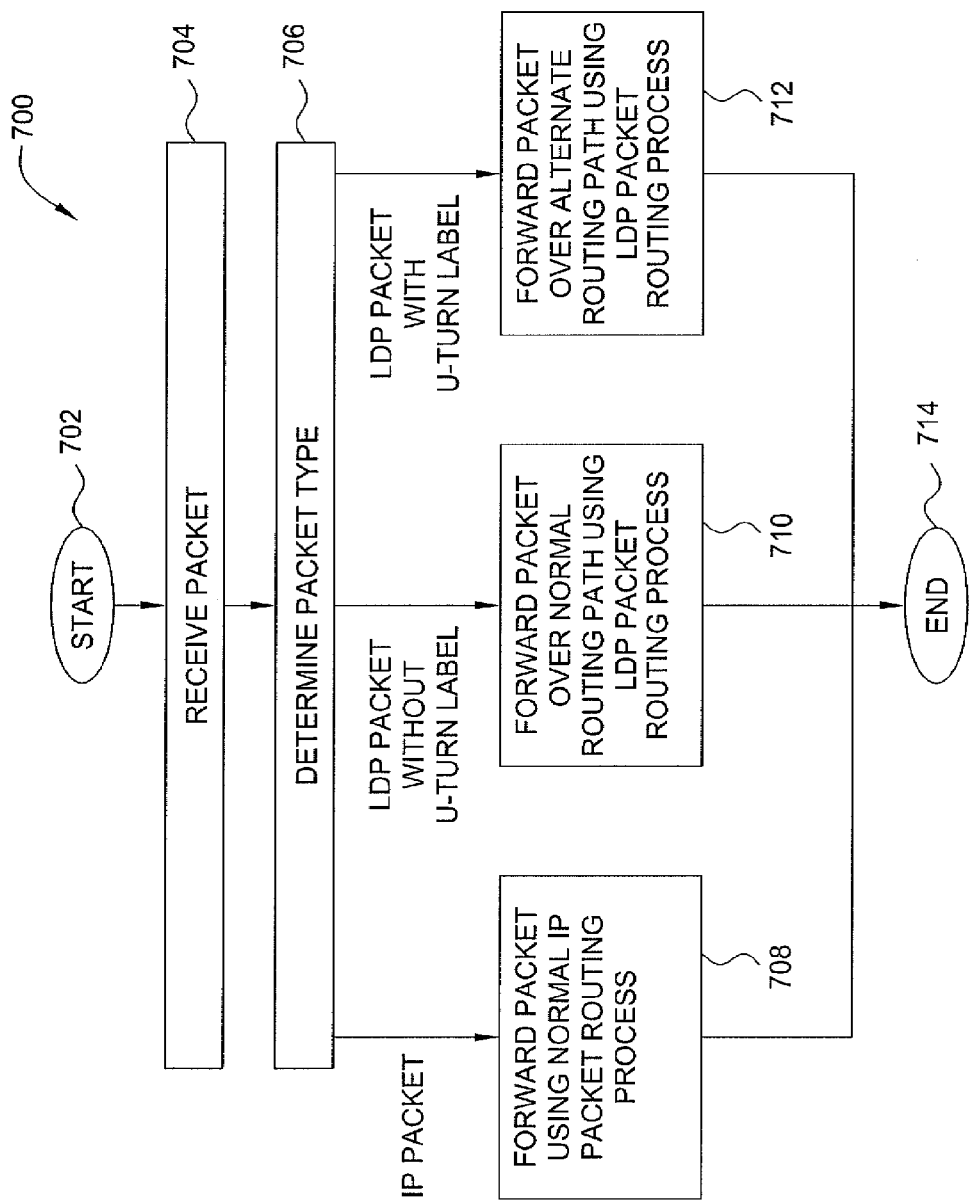
FIG. 7 depicts one embodiment of a method for processing a packet received at a node.

FIG. 7 depicts one embodiment of a method for processing a packet received at a node.

At step 702, method 700 begins.

At step 704, a packet is received at the node.

At step 706, a packet type of the received packet is determined by the node. The determination of the packet type enables a determination as to the manner in which the packet is forwarded by the node. In one embodiment, for example, three packet types may be supported as follows: IP packet, LDP packet without u-turn label, and LDP packet with u-turn label.

If the packet is identified as being an IP packet, method 700 proceeds to step 708, at which point the forwarding of the packet is performed using a normal IP packet routing process (e.g., finding a next-hop label for the packet, inserting the next-hop label, and forwarding the packet along a normal routing path toward its destination node). From step 708, method 700 proceeds to step 714.

If the packet is identified as being an LDP packet without a u-turn label, method 700 proceeds to step 710, at which point the forwarding of the packet is performed using an LDP packet routing process and a normal routing path (e.g., finding a next-hop LDP label for the LDP-labeled packet, replacing the current next-hop LDP label with the determined next-hop LDP label, and forwarding the packet along a normal routing path toward its destination node). From step 710, method 700 proceeds to step 714.

If the packet is identified as being an LDP packet without a u-turn label, method 700 proceeds to step 712, at which point the forwarding of the packet is performed using an LDP packet routing process and an alternate routing path (e.g., finding a next-hop LDP label for the LDP-labeled packet, replacing the current next-hop LDP label with the determined next-hop LDP label, and forwarding the packet along an alternate routing path toward its destination node). From step 712, method 700 proceeds to step 714.

At step 714, method 700 ends.

In one embodiment, the u-turn fast rerouting capability depicted and described herein may be employed in combination with one or more other rerouting schemes. While the u-turn fast rerouting capability enables LDP to provide a fast and cost-effective way to accomplish u-turn fast rerouting within a service provider network, the u-turn fast rerouting capability may not cover all possible network topologies which may be implemented within the service provider network. In one such embodiment, the Loop-Free Alternate (LFA) scheme may be implemented within the service provider network, at least to cover topologies not covered by the u-turn fast rerouting capability. When a combination of the u-turn fast rerouting capability and the LFA scheme is used within a service provider network, fast reroute may be provided for virtually all types of topologies which may be used within the service provider network.

Although the u-turn fast rerouting capability is primarily depicted and described herein within the context of an IP/MPLS network running LDP, it will be appreciated that the u-turn fast rerouting capability may be utilized in other suitable types of communication networks using other suitable protocols.

Although the u-turn fast rerouting capability is primarily depicted and described herein with respect to embodiments using specific numbers, types, and arrangements of labels, it will be appreciated that various embodiments of the u-turn fast rerouting capability may be provided using other numbers, types, and/or arrangements of labels.

Figure 8:
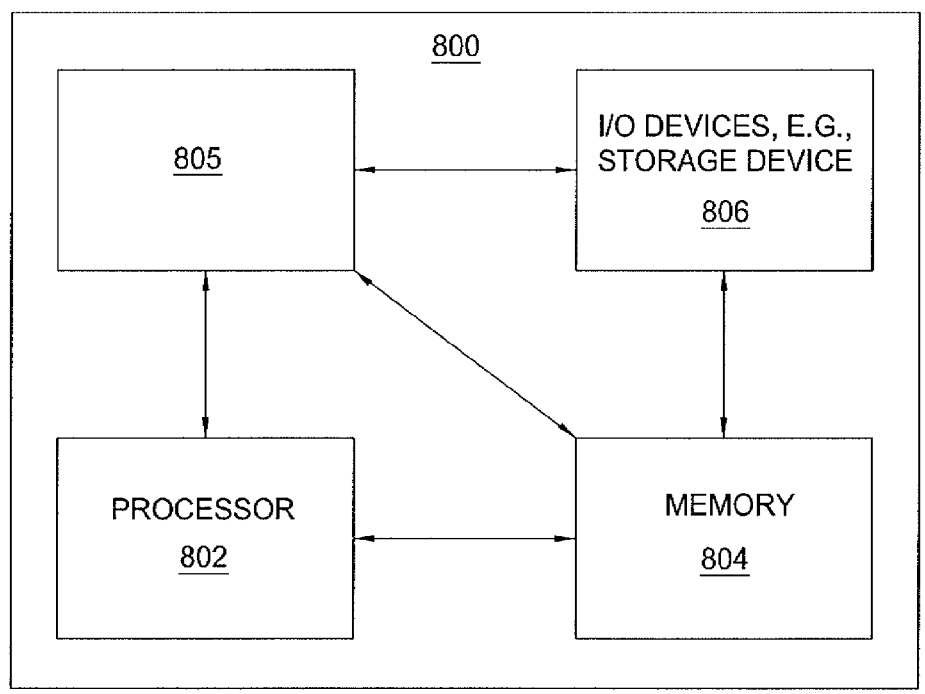
FIG. 8 depicts a high-level block diagram of a computer suitable for use in performing the functions described herein.

FIG. 8 depicts a high-level block diagram of a computer suitable for use in performing functions described herein.

As depicted in FIG. 8, computer 800 includes a processor element 802 (e.g., a central processing unit (CPU) and/or other suitable processor(s)), a memory 804 (e.g., random access memory (RAM), read only memory (ROM), and the like), a cooperating module/process 805, and various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 805 can be loaded into memory 804 and executed by processor 802 to implement functions as discussed herein. Thus, cooperating process 805 (including associated data structures) can be stored on a computer readable storage medium, e.g., RAM memory, magnetic or optical drive or diskette, and the like.

It will be appreciated that computer 800 depicted in FIG. 8 provides a general architecture and functionality suitable for implementing functional elements described herein and/or portions of functional elements described herein. For example, the computer 800 provides a general architecture and functionality suitable for implementing one or more of the nodes 110 or portions of the nodes 110.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
   determining, by a first node, a first Label Distribution Protocol (LDP) label that is associated with a Forwarding Equivalence Class (FEC) of a destination node and a first u-turn label that is associated with the FEC of the destination node and that is associated with at least one other FEC;
   receiving, at the first node from a second node, a packet intended for the destination node;
     wherein the packet comprises an Internet Protocol (IP) packet, the first u-turn label, and the first LDP label, wherein the first u-turn label is prepended to the IP packet and the first LDP label is prepended to the first u-turn label;
wherein the first u-turn label is configured to indicate to the first node that the packet is being returned to the first node by the second node due to a condition preventing propagation of the packet toward the destination node;
selecting, at the first node based on inclusion of the first u-turn label within the packet, a routing path for routing the packet toward the destination node, wherein the routing path for routing the packet toward the destination node comprises a third node;
determining, at the first node, a second u-turn label for the packet and a second LDP label for the packet, wherein the second u-turn label is configured to indicate to the third node that u-turn routing was performed upstream of the third node;
forming a modified packet at the first node by replacing the first u-turn label received in the packet with the second u-turn label and replacing the first LDP label received in the packet with the second LDP label; and
forwarding the modified packet from the first node toward the third node for routing the modified packet toward the destination node based on the routing path.

2. The method of claim 1, further comprising:
prior to the receiving step:
  receiving the IP packet at the first node, wherein the IP packet is received from the second node, wherein the IP packet is intended for the destination node;
  selecting an initial routing path for routing the IP packet toward the destination node; and
  transmitting the IP packet toward the second node based on the selected initial routing path.

3. The method of claim 1,
wherein the first node determines the first LDP label and the first u-turn label by receiving, from the second node in at least one label exchange, an indication of the first LDP label and an indication of the first u-turn label.

4. The method of claim 3, further comprising:
computing the routing path based on receipt of the indication of the u-turn label from the second node.

5. The method of claim 1, further comprising:
propagating, from the first node toward the third node in a label exchange, an indication of the second u-turn label.

6. The method of claim 5, wherein the second u-turn label is propagated from the first node toward the third node during establishment of an LDP session between the first node and the third node or during a u-turn label exchange process between the first node and the third node.

7. An apparatus, comprising:
a processor and a memory communicatively connected to the processor, the processor configured to:
  determine, by a first node, a first Label Distribution Protocol (LDP) label that is associated with a Forwarding Equivalence Class (FEC) of a destination node and a first u-turn label that is associated with the FEC of the destination node and that is associated with at least one other FEC;
  receive, at the first node from a second node, a packet intended for the destination node;
  wherein the packet comprises an Internet Protocol (IP) packet, the first u-turn label, and the first LDP label, wherein the first u-turn label is prepended to the IP packet and the first LDP label is prepended to the first u-turn label;
  wherein the first u-turn label is configured to indicate to the first node that the packet is being returned to the first node by the second node due to a condition preventing propagation of the packet toward the destination node;
  select, at the first node based on inclusion of the first u-turn label within the packet, a routing path for routing the packet toward the destination node, wherein the routing path for routing the packet toward the destination node comprises a third node;
  determine, at the first node, a second u-turn label for the packet and a second LDP label for the packet, wherein the second u-turn label is configured to indicate to the third node that u-turn routing was performed upstream of the third node;
  form a modified packet at the first node by replacing the first u-turn label received in the packet with the second u-turn label and replacing the first LDP label received in the packet with the second LDP label; and
  forward the modified packet from the first node toward the third node for routing the modified packet toward the destination node based on the routing path.

8. The apparatus of claim 7, wherein the processor is configured to:
prior to the receiving the packet at the first node:
  receive the IP packet at the first node, wherein the IP packet is received from the second node, wherein the IP packet is intended for the destination node;
  select an initial routing path for routing the IP packet toward the destination node; and
  transmit the IP packet toward the second node based on the selected initial routing path.

9. The apparatus of claim 7, wherein, to determine the first LDP label and the first u-turn label, the processor is configured to:
receiving, at the first node from the second node, in at least one label exchange, an indication of the first LDP label and an indication of the first u-turn label.

10. The apparatus of claim 9, wherein the processor is configured to:
compute the routing path based on receipt of the indication of the first u-turn label from the second node.

11. The apparatus of claim 7, wherein the processor is configured to:
propagate, from the first node toward the third node in a label exchange, an indication of the second u-turn label.

12. The apparatus of claim 11, wherein the processor is configured to propagate the second u-turn label from the first node toward the third node during establishment of an LDP session between the first node and the third node or during a u-turn label exchange process between the first node and the third node.

13. A method, comprising:
determining, by a first node, a Label Distribution Protocol (LDP) label that is associated with a Forwarding Equivalence Class (FEC) of a destination node and a first u-turn label that is associated with the FEC of the destination node;
receiving, at the first node from a second node, a packet intended for the destination node, wherein the packet comprises an Internet Protocol (IP) packet having the first u-turn label prepended thereto;
selecting, at the first node based on a determination that the packet includes the first u-turn label and does not include the LDP label, an alternate routing path for routing the packet toward the destination node via a third node;
determining, at the first node, a second u-turn label for the packet, wherein the second u-turn label is configured to indicate to the third node that u-turn routing was performed upstream of the third node;
forming a modified packet at the first node by replacing the first u-turn label received in the packet with the second u-turn label; and
forwarding the modified packet from the first node toward the third node for routing the modified packet toward the destination node based on the alternate routing path.

14. An apparatus, comprising:
a processor and a memory communicatively connected to the processor, the processor configured to:
  determine, by a first node, a Label Distribution Protocol (LDP) label that is associated with a Forwarding Equivalence Class (FEC) of a destination node and a first u-turn label that is associated with the FEC of the destination node;
  receive, at the first node from a second node, a packet intended for the destination node, wherein the packet comprises an Internet Protocol (IP) packet having the first u-turn label prepended thereto;
  select, at the first node based on a determination that the packet includes the first u-turn label and does not include the LDP label, an alternate routing path for routing the packet toward the destination node via a third node;
  determine, at the first node, a second u-turn label for the packet, wherein the second u-turn label is configured to indicate to the third node that u-turn routing was performed upstream of the third node;
  form a modified packet at the first node by replacing the first u-turn label received in the packet with the second u-turn label; and
  forward the modified packet from the first node toward the third node for routing the modified packet toward the destination node based on the alternate routing path.

* * * * *